US012574681B2

(12) United States Patent
Mareuge et al.

(10) Patent No.: US 12,574,681 B2
(45) Date of Patent: Mar. 10, 2026

(54) SYSTEM FOR REAL-TIME RECOGNITION AND IDENTIFICATION OF SOUND SOURCES

(71) Applicants: UBY, Paris (FR); WAVELY, Villeneuve d'Ascq (FR)

(72) Inventors: Laurent Mareuge, Marly le Roi (FR); Julien Roland, Marcq en Baroeuil (FR); Maxime Baelde, Lille (FR)

(73) Assignees: Uby, Paris (FR); Wavely, Villeneuve d'Ascq (FR)

( * ) Notice: Subject to any disclaimer, the term of this patent is extended or adjusted under 35 U.S.C. 154(b) by 548 days.

(21) Appl. No.: 17/918,619

(22) PCT Filed: Apr. 16, 2021

(86) PCT No.: PCT/FR2021/050674
§ 371 (c)(1),
(2) Date: Oct. 13, 2022

(87) PCT Pub. No.: WO2021/209726
PCT Pub. Date: Oct. 21, 2021

(65) Prior Publication Data

US 2023/0143027 A1 May 11, 2023

(30) Foreign Application Priority Data

Apr. 16, 2020 (FR) .................................. FR2003842

(51) Int. Cl.
*H04R 3/04* (2006.01)
*H04R 1/08* (2006.01)

(52) U.S. Cl.
CPC ................. *H04R 3/04* (2013.01); *H04R 1/08* (2013.01)

(58) Field of Classification Search
None
See application file for complete search history.

(56) References Cited

U.S. PATENT DOCUMENTS 3,770,892 A * 11/1973 Clapper .................. G10L 15/00 704/235
6,012,334 A * 1/2000 Ando ....................... G01H 3/08 73/648

(Continued)

FOREIGN PATENT DOCUMENTS

CN 106055573 A * 10/2016 ........... G06F 16/583
CN 107545033 A * 1/2018

(Continued)

OTHER PUBLICATIONS

French preliminary search report issued for FR 2003842.

(Continued)

*Primary Examiner* — Lisa M Caputo
*Assistant Examiner* — Cynthia L Davis
(74) *Attorney, Agent, or Firm* — Harness, Dickey & Pierce, P.L.C.

(57) ABSTRACT

The present invention relates to a method for identifying a sound source comprising the following steps: (S1): acquisition of a sound signal; (S2): application of a frequency fitter to the acquired sound signal in order to obtain a filtered signal; (S4): extraction of a matrix of features associated with the filtered signal; (S5): identification of the source by applying a classification model to the feature matrix extracted in step (S4), the classification model having, as its output, at least one class associated with the source of the acquired sound signal.

14 Claims, 2 Drawing Sheets

(56) References Cited

U.S. PATENT DOCUMENTS

| | | | | |
|---|---|---|---|---|
| 6,058,205 | A * | 5/2000 | Bahl | G06F 18/24323 704/231 |
| 6,243,671 | B1 * | 6/2001 | Lago | G01H 3/08 704/E15.014 |
| 6,243,695 | B1 * | 6/2001 | Assaleh | G06V 10/75 713/182 |
| 2008/0243505 | A1 * | 10/2008 | Barinov | G10L 15/22 704/E15.001 |
| 2010/0142725 | A1 * | 6/2010 | Goldstein | G01H 3/14 381/92 |
| 2017/0315516 | A1 * | 11/2017 | Kozionov | G01M 13/045 |
| 2017/0372242 | A1 | 12/2017 | Alsubai et al. | |
| 2020/0066257 | A1 | 2/2020 | Smith et al. | |
| 2020/0191643 | A1 * | 6/2020 | Davis | G01H 1/00 |

FOREIGN PATENT DOCUMENTS

| | | | |
|---|---|---|---|
| EP | 1092964 | A2 | 4/2001 |
| WO | WO-2016/198877 | A1 | 12/2016 |

OTHER PUBLICATIONS

International search report issued for PCT FR2021/050674.

Pan, Z., et al., "Cognitive Acoustic Analytics Service for Internet of Things," 2017 IEEE 1st International Conference on Cognitive Computing, pp. 96-103 (2017).

Maijala, P., et al., "Environmental noise monitoring using source classification in sensors," Applied Acoustics, 129, pp. 258-267 (2018).

Cai, Y., et al., "Sound Recognition," Computing with Instinct, pp. 16-34 (2011).

* cited by examiner

SYSTEM FOR REAL-TIME RECOGNITION AND IDENTIFICATION OF SOUND SOURCES

CROSS-REFERENCE TO RELATED APPLICATIONS

This application is a National Phase Entry of PCT International Patent Application No. PCT/FR2021/050674, filed on Apr. 16, 2021, which claims priority to French Patent Application Serial No. 2003842, filed on Apr. 16, 2020, both of which are incorporated by reference herein.

TECHNICAL FIELD

The present invention relates to the field of analysis and control of environmental nuisance. More specifically, the field of the invention relates to the recognition and identification of noise pollution, in particular in an environment linked to construction site noise.

BACKGROUND

The growing attention paid to nuisances, in particular those generated by construction sites or industrial operations in urban areas, requires the development of new tools allowing the detection and control of these nuisances. Thus, many methods have been proposed to allow the detection of noise pollution, as well as their localization. For example, it has already been proposed to install sound level meters on construction sites to measure the sound level.

For example, document US 2017/0372242 proposes installing a network of sound sensors in the geographical area to be monitored and analyzing the noises detected by these sensors in order to create a noise map. The system then generates noise threshold crossing alerts in order to get people out of the concerned area if the noise level is considered harmful.

Document WO 2016/198877 in turn proposes a noise monitoring method in which the sound data collected are recorded when a certain sound level is exceeded. These data are then used to identify the sound source and produce a map to identify the areas generating the most noise.

However, the Applicant realized that not all noise created the same level of annoyance for local residents. Consequently, the simple measurement of the sound level is not sufficient to determine whether a given noise should be considered as a noise nuisance. However, the stakes are high. Indeed, in urban areas, the risks incurred in the event of noise pollution are the suspension of time exemptions, which necessarily lead to a delay in the delivery of the site and heavy financial penalties for the builder, not to mention the impact on the human health that this may have.

SUMMARY

A purpose of the invention is to overcome the aforementioned disadvantages of the prior art. In particular, a purpose of the invention is to propose a solution allowing to detect noises, which is capable of identifying the source(s) of the noise nuisance, of exposing it and of making this information available in real time, in order to improve the control of these noises in a given geographical area and/or improve communication with local residents, in order to reduce the risk of suspension of time derogations or even, if possible, to obtain additional time derogations and thus reduce the duration of the construction.

Another purpose of the invention is to propose a solution allowing to detect and analyze noises and manage these noises in real time with a view to reducing noise pollution in a given geographical area. For this purpose, according to a first aspect, the present invention proposes a method for identifying a sound source comprising the following steps:

- S1: acquisition of a sound signal; μS2: application of a frequency filter to the acquired sound signal in order to obtain a filtered signal;
- S4: extraction of a set of features associated with the filtered signal;
- S5: identification of the source by applying a classification model to the matrix of features extracted in step S4, the classification model having as its output at least one class associated with the source of the acquired sound signal.

The invention is advantageously completed by the following features, taken alone or in any of their technically possible combination:

- the frequency filter comprises a frequency weighting filter and/or a high pass filter;
- the set of features is a sonogram representing sound energies associated with instants of the filtered signal and at given frequencies;
- the frequencies are converted according to a non-linear frequency scale;
- the non-linear frequency scale is a Mel scale;
- the sound energies represented in the sonogram are converted according to a logarithmic scale;
- the method further comprises, prior to step S5, a step S4 bis, of normalizing the features of the set of features according to statistical moments of the features of the set of features;
- the classification model used in step S5 is one of the following models: a generative model or a discriminating model;
- the output of the classification model comprises one of the following elements: a class of sound source identified as the origin of the sound signal, a vector of probabilities, each probability being associated with a class of sound source, a list of classes of different sound sources identified as the origin of the sound signal;
- the method further comprises, prior to step S4, a step S3, of detecting a sound event, the steps S4 and S5 being implemented only when a sound event is detected, the detection of a sound event depending: on an indicator of an energy of the sound signal acquired in step S1, and/or on the reception of a signaling of a sound event;
- the method further comprises a step of notifying a sound event when a sound event is detected, and/or when a signaling is received.

The invention proposes, according to a second aspect, a system for identifying a sound source, comprising:

- a sound sensor configured to acquire a sound signal in a predetermined geographical area,
- means for applying a frequency filter of the acquired sound signal in order to obtain a filtered signal;
- means for identifying the source using a classification model applied to a set of features associated with the filtered, the classification model having as its output at least one class associated with the source of the acquired sound signal.

The invention is advantageously completed by the following features, taken alone or in any of their technically possible combination:

- the system further comprises a detector of a sound event depending on an indicator of an energy of the sound signal acquired by the sound sensor, and/or on the reception by the identification system of a signaling of a sound event emitted by signaling means;

the signaling means comprise a mobile terminal configured to allow the signaling of a sound event by a user of the mobile terminal when the user is at a distance less than a given threshold from the predetermined geographical area;

the sound sensor is fixed;

the sound sensor is mobile;

the system further comprises notification means configured to allow notification of a sound event when the detector of a sound event detects a sound event, and/or when the signaling means emit a signaling;

the notification means comprise a terminal configured to display a notification of a sound event.

BRIEF DESCRIPTION OF THE FIGURES

Other features and advantages of the present invention will appear upon reading the following description of a preferred embodiment. This description will be given with reference to the appended drawings in which.

DETAILED DESCRIPTION

Figure 1:
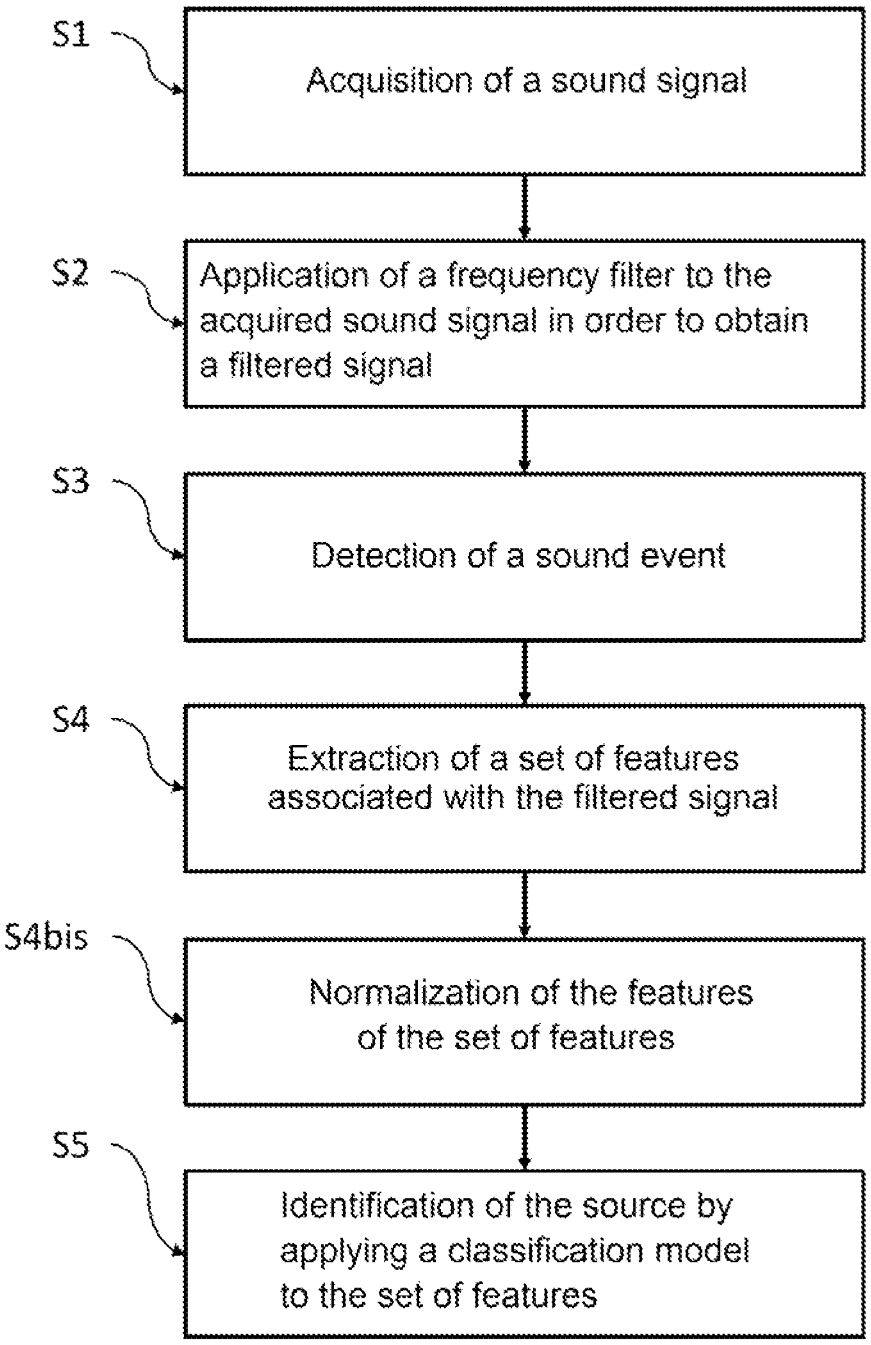
FIG. 1 shows the steps of a preferred embodiment of the method according to the invention.

With reference to FIG. 1, a method for identifying sound sources according to the invention comprises a step S1, during which a sound signal is acquired, for example by a sound sensor, in an area that can generate noise pollution. In order to allow real-time operation, the acquired signal may be of short duration (between a few seconds and a few tens of seconds, for example between two seconds and thirty seconds), thus allowing rapid and direct processing of the acquired data.

During a step S2, a frequency filter is applied to the signal acquired during step S1 in order to correct defects in the signal. These defects can for example be generated by the sound sensor(s) used during step S1.

In one embodiment, the filter comprises a high pass filter configured to remove a DC component present in the signal or irrelevant noise such as wind noise. Alternatively, the filter comprises a more complex filter, such as a frequency-weighted filter (A, B, C and D weighting). The use of a frequency-weighted filter is particularly advantageous because these filters reproduce the perception of the human ear and thus facilitate the extraction of features.

Steps S1 and S2 thus form a first phase of pre-processing the acquired sound signal. The method further comprises a second classification phase, comprising the following steps.

During a step S4, a set of features is extracted from the sound signal ("Feature extraction"). This set could for example be a matrix or a tensor. This step S4 allows to represent the sound signal in a way that is more understandable for a classification model while reducing the dimension of the data.

In a first embodiment, step S4 is performed by transforming the sound signal into a sonogram (or spectrogram) representing the amplitude of the sound signal as a function of frequency and time. The sonogram is therefore a representation in the form of an image of the sound signal. The use of a visual representation of the sound signal in the form of an image then allows to use the numerous classification models developed for the field of computer vision. These models having become particularly powerful in recent years, transforming any problem into a computer vision problem allows to benefit from the performance of the models developed for this type of problem (in particular thanks to pre-trained models).

Following the feature extraction step S4, the method comprises an optional step of modifying the scale of the frequencies in order to better correspond to the perception of the human ear and to reduce the size of the images representing the sonograms. In one embodiment, the modification step is carried out using a non-linear frequency scale: the Mel scale, the Bark scale, the Equivalent Rectangular Bandwidth ERB.

During a step S5, a classification model is then applied to the sonogram (possibly modified). The classification model can in particular be chosen from the following models: a generative model, such as a Gaussian Mixture Model GMM, or a discriminating model, such as a Support Vector Machine SVM, a random forest. Since these models are relatively undemanding in terms of computing resources during the inference steps, they can advantageously be used in embedded systems with limited computing resources while allowing real-time operation of the identification method.

Alternatively, the discriminating model used for the classification is of the neural network type, and more particularly a convolutional neural network. Advantageously, the convolutional neural network is particularly efficient for classification from images. In particular, architectures such as SqueezeNet, MNESNet or MobileNet (and more particularly MobileNetV2) allow to benefit from the power and precision of convolutional neural networks while minimizing the necessary computing resources. Similarly to the aforementioned models, the convolutional neural network has the advantage of also being able to be used in embedded systems with limited computing resources while allowing real-time operation of the identification method.

The combination of the pre-processing steps S1 and S2, as well as the step of modifying the frequency scale with the use of a classification model allows the method to identify sound sources in a complex environment, that is to say comprising a large number of different sound sources such as a construction site, a factory, an urban environment, or offices, in particular by allowing the classification model to more easily discern sources of noise pollution from "normal" sounds such as the voice for example, generating no (or little) nuisance.

Regardless of the classification model(s) chosen, the method comprises an initial step during which these models are previously trained to recognize different types of noise considered relevant for the area to be monitored. For example, in the case of monitoring noise pollution from a construction site, the initial training step may comprise the recognition of hammer blows, the noise of a grinder, the noise of trucks, etc.

In a first variant embodiment, the classification model can be configured to identify a specific source. The output of the model can then take the form of a result in the form of a label (such as "Hammer", "Grinder", "Truck" for the examples mentioned above).

In a second variant embodiment, the classification model can be configured to provide probabilities associated with each type of possible source. The output of the model can then take the form of a vector of probabilities, each probability being associated with one of the possible labels. Thus, in one example, the model output for the examples of labels mentioned above might comprise the following vector: [hammer: 0.2; grinder: 0.5; truck: 0.3]. These two configurations of the classification model then allow to identify the main source of nuisance.

In a third variant embodiment, the classification model is configured to detect multiple sources. The output of the model can then take the form of a vector of values associated with each label, each value representing a level of confidence associated with the presence of the source in the classified sound signal. The sum of the values can therefore be different from 1. Thus, in an example, the output of the model for the examples of labels mentioned above can comprise the following vector: [hammer: 0.3; grinder: 0.6; truck: 0.4]. A threshold can then be applied to this vector of values to identify the sources that are certainly present in the sound signal.

Moreover, in order to improve the robustness of the trained classification model, the data used for the training can be prepared in order to remove the examples that may lead to confusion between several sources, for example by removing the examples of sound samples comprising several different sound sources. In addition, training data consisting of a sound sample and a class can be randomly selected in order to allow a person to verify that the class associated with a sound sample corresponds to reality. If necessary, the class can be changed to reflect the true sound source of the sound sample.

Alternatively, in order to minimize the resources necessary for the implementation of the method (calculation time, energy, memory, etc.), the method further comprises, between steps S2 and S4, a sound event detection step S3. The sound event detection can in particular be based on metrics relating to the energy of the sound signal. For example, step S3 is carried out by calculating at least one of the following parameters of the sound signal; signal energy, crest factor, temporal kurtosis, zero crossing rate, and/or Sound Pressure Level SPL. When at least one of these parameters representing the intensity of the potential noise pollution exceeds a given threshold or has specific features, a noise event is detected. These particular features being able to be, for example, relating to the envelope of the signal (such as a strong discontinuity representing the attack or the release of the event), or to the distribution of the frequencies in the spectral representation (such as a variation of the spectral center of gravity).

This sound event detection step S3 further allows to improve the performance of the classification model, in particular when the various sound sources to be identified have strong differences in sound level. In one embodiment, step S4 is implemented only when a sound event is detected in step S3, which allows to implement the classification phase only when a potential nuisance is detected. In addition, when a potential nuisance is detected, the sound signal (filtered or not) as well as the result of the classification may be subject to additional processing steps. Where appropriate, location data can be taken into account (by taking into account the position of the sensor for example).

In a first sub-step, the signals can be aggregated when they are identified as coming from the same sound source detected in step S5 in the sound signal, for example according to their location, to the identified source, as well as to their proximity in time. An A-weighted continuous equivalent noise level ($L_{Aeq}$) can then be calculated from the signals (aggregated or not) and compared to a predefined threshold. If this threshold is exceeded, a notification can be emitted to the personnel responsible for managing the site monitored by one or more sensors. This notification can be done by means of an alert sent to a terminal such as a smartphone or computer, and can also be saved in a database for display through a user interface. In a variant embodiment, the probabilities or values associated with each label, returned by the classification model can be compared with thresholds defined for each type of source, these thresholds being set so as to correspond to a minimum level of detection admissible for said source, in order to decide whether to send a notification, typically to a site manager so that the latter implements the necessary actions to reduce noise pollution.

Alternatively or in addition, noise event detection can be carried out by signaling by local residents. For this purpose, local residents have an application, for example a mobile application on a terminal such as a smartphone, in which local residents send a signal when they detect noise pollution. Signaling leading to a detection, by association, of a sound event according to step S3. Advantageously, taking signalings by local residents into account allows to take into account their feelings regarding noise and to improve the discrimination of noises that must be considered as noise pollution.

Additionally, detections resulting from signalings by local residents may be subject to additional processing steps. These signalings can be aggregated according to their similarity, for example if they all come from the same geographical area and/or were made at a certain time. In addition, these signalings can be associated with detected sound events recorded by a sensor, again according to rules of geographical and temporal proximity. The signalings can then be notified to the personnel responsible for managing the site monitored by one or more sensors.

In a variant embodiment, the events detected can be recorded in a database with, where applicable, the signalings sent. These data can thus be analyzed in order to detect when an event similar to a past event having generated signalings takes place, this information can then be the subject of a notification intended for the personnel responsible for the management of the site monitored by one or more sensors, typically for a site manager so that he can implement the necessary actions to reduce noise pollution.

If necessary, a normalization step S4 bis can be implemented after the feature extraction step S4 in order to minimize the consequences of variations in the conditions for acquiring the sound signal (distance to the microphone, signal power, level of ambient noise, etc.). The normalization step may in particular comprise the application of a logarithmic scale to the signal amplitudes represented in the sonogram. Alternatively, the normalization step comprises a statistical normalization of the signal amplitudes represented by the sonogram so that the average of the signal amplitudes has a value of 0 and its variance a value of 1 in order to obtain a reduced centered variable.

Furthermore, the detected and identified sound events can undergo additional post-processing to improve the reliability of the identifications. This post-processing allows to evaluate the reliability of the identifications carried out and to reject the identifications evaluated as unreliable. For this purpose, post-processing can comprise the following steps:

Comparison of the sound level $L_{Aeq}$ (or equivalent sound level) of the event with a first predetermined threshold, the identification then being considered reliable if the sound level $L_{Aeq}$ of the event is greater than the threshold, otherwise the identification is considered unreliable and the event is rejected;

Comparison of the value representing a level of confidence associated with the presence of the source identified in the classified sound signal with a second predetermined threshold, the identification of the source being considered as reliable, when the value representing the level of confidence is higher than the second threshold, otherwise, the identification is considered unreliable and the event is rejected. This step ensures that the classification performed is sufficiently reliable. Indeed, the fact that the source identified during the classification is the source with the highest level of confidence among all the possible sources does not imply that the corresponding level of confidence is high.

A sound event considered unreliable will then not be notified to the personnel responsible for managing the site monitored by the sensor(s) and will not be displayed on the user interface. However, in the case of an event detected following a signaling from a local resident, the event may however be kept and be the subject of a notification indicating it to the personnel responsible for managing the monitored site as an event not having exceeded the various comparison thresholds but having been the subject of a signaling, in particular when other signalings for similar sources and geographical areas have already taken place.

Additionally or alternatively, the different sources identified during classification may have a certain redundancy in the form of a hierarchy, that is to say a class representing a type of source may be a parent class of several other classes representing types of sources (they are called child classes). For example, a parent class can be of the "construction machine" type and comprise child classes such as "digger", "truck", "loader", etc. The use of this hierarchy further improves the reliability of detection and identification. Indeed during the post-processing described previously and when the identified class is a parent class, it is then possible to add, during the comparison of the value representing the level of confidence of the identification to the second threshold, a step of identifying the child class having the highest confidence level, and comparing the confidence level associated with the child class with a third predetermined threshold (which may be identical to the second). In this case, if the confidence level of the child class is greater than the third threshold, it is this child class that will be used as the identified source of the sound event, otherwise, the parent class will simply be used.

Figure 2:
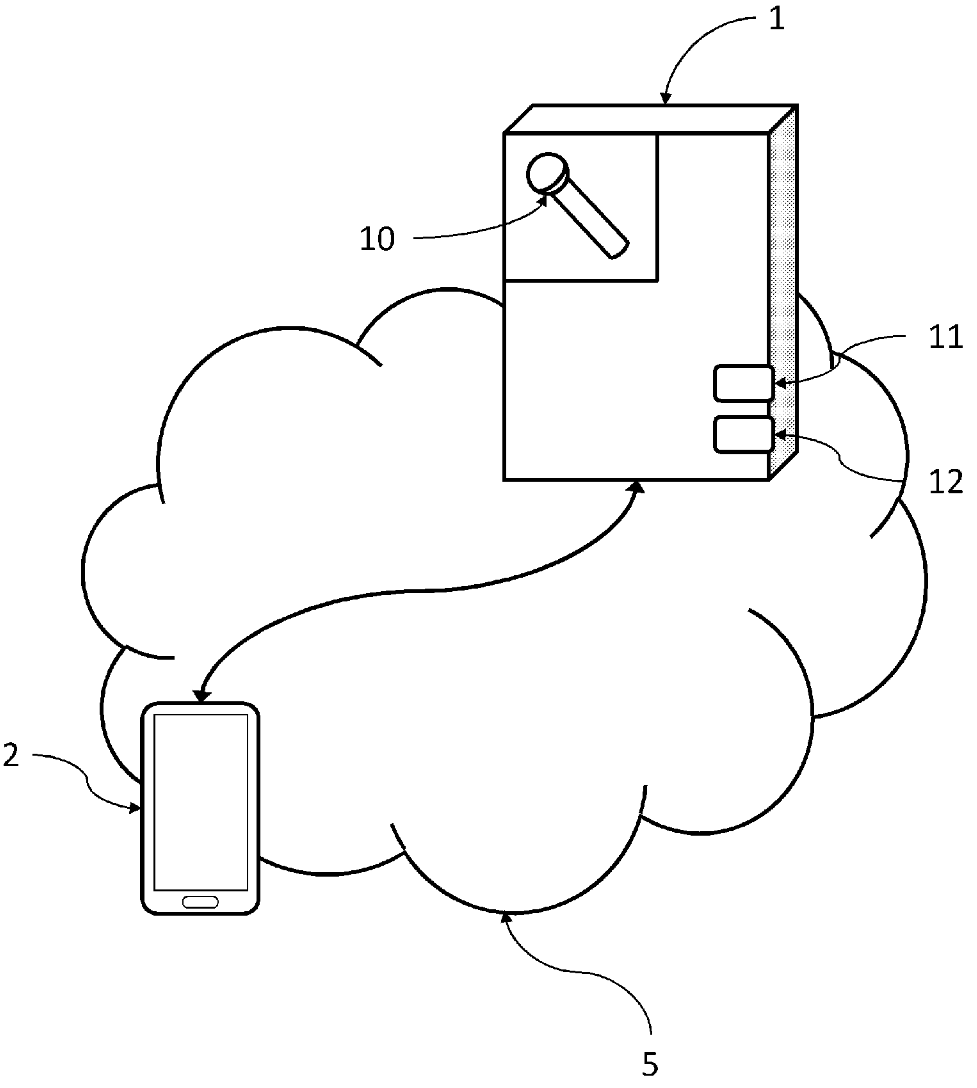
FIG. 2 is a diagram of an architecture for implementing the method according to the invention.

Moreover, some types of sources may be considered irrelevant (and therefore not subject to notification). These types of irrelevant sources can correspond to sources that are not related to the monitored area, and be enumerated in the form of a list specific to the monitored area. For example, when the monitored area is a construction site, the irrelevant source types may comprise cars, sirens, etc. With reference to FIG. 2, the method for identifying sound sources can be implemented by a system comprising an identification device 1 comprising a microphone 10, data processing means 11 of the processor type configured to implement the method for identifying sound sources according to the invention, as well as data storage means 12, such as a computer memory, for example a hard disk, on which are recorded code instructions for the execution of the method for identifying sound sources according to the invention.

In one embodiment, the microphone 10 is capable of detecting sounds in a wide spectrum, that is to say a spectrum covering infrasound to ultrasound, typically from 1 Hz to 100 kHz. Such a microphone 10 thus allows to better identify noise nuisances by having complete data, but also to detect a greater number of nuisances (for example detecting vibrations).

The identification device 1 can for example be integrated into a box that can be attached in a fixed manner in a geographical area in which noise pollution must be monitored and controlled. For example, the box can be fixed on a site palisade, at a fence or on equipment the level of nuisance of which must be monitored. Alternatively, the identification device 1 can be miniaturized in order to make it mobile. Thus, the identification device 1 can be worn by personnel working in the geographical area such as personnel of the site to be monitored. Typically, the microphone 10 can be integrated and/or attached to the collar of the personnel.

In one embodiment, the identification device can be communicating with clients 2, a client possibly being for example a smartphone of a user of the system. The identification device 1 and the clients 2 are then communicating by means of an extended network 5 such as the Internet network for the exchange of data, for example by using a mobile network (such as GPRS, LTE, etc.).

The invention claimed is:

1. A method implemented by a data processor of a noise monitoring device, comprising the steps of:

S1: obtaining a sound signal emitted at a construction site and acquired by a sound sensor;

S2: applying a frequency filter to the obtained sound signal, thereby obtaining a filtered signal;

S4: extracting features from the filtered signal;

S5: identifying a specific sound source by applying a classification model to the features extracted in step S4 and providing at least one label associated to the specific sound source, wherein the specific sound source is a parent source as defined in a hierarchic model in which each sound source is either a parent source or a child source linked to a parent source; and a post-processing step, subsequent to step S5, which comprises the following sub-steps:

evaluating a sound level of the obtained sound signal and comparing the evaluated sound level with a first predetermined threshold, said identifying is then considered reliable if the evaluated sound level is greater than the first predetermined threshold;

comparing a value representing a level of confidence associated with the presence of the specific sound source in the obtained sound signal with a second predetermined threshold;

based on the value representing the level of confidence associated with the presence of the specific sound source in the obtained sound signal being greater than the second predetermined threshold:

selecting, from one or more child sources linked to the specific sound source, the child source having a highest level of confidence associated with the presence of the child source in the obtained sound signal;

comparing the level of confidence associated with the presence of the selected child source in the obtained sound signal with a third predetermined threshold;

based on the level of confidence associated with the presence of the selected child source in the obtained sound signal being greater than the third predetermined threshold, the specific sound source is changed to the selected child source; and based on the level of confidence associated with the presence of the selected child source in the obtained sound signal being lower than the third predetermined threshold, the specific sound source remains the parent source; and based on the value representing the level of confidence associated with the presence of the specific sound source in the obtained sound signal being lower than the second predetermined threshold, said identifying is considered not reliable; and communicating an identification signal to a client device based on the identifying being reliable, and not communicating an identification signal based on the identifying being not reliable.

2. The method of claim 1, wherein the frequency filter comprises a frequency weighting filter and/or a high pass filter.

3. The method of claim 1, wherein extracting the features comprises transforming the filtered signal into a sonogram representing sound energies associated with instants and frequencies.

4. The method of claim 3, further comprising converting the frequencies according to a non-linear frequency scale.

5. The method of claim 4, wherein the non-linear frequency scale is a Mel scale.

6. The method of claim 4, further comprising converting the sound energies according to a logarithmic scale.

7. The method of claim 1, further comprising, prior to step S5, normalizing the extracted features according to statistical moments of said extracted features.

8. The method of claim 1, wherein the classification model used in step S5 is one of a generative model or a discriminating model.

9. The method of claim 1, wherein the at least one label identifying a specific sound source comprises one of the following elements: a single label, a plurality of labels each associated with a probability.

10. The method of claim 1, further comprising, prior to step S4, a step S3, of detecting a sound event, the steps S4 and S5 being implemented only when a sound event is detected, the detection of a sound event depending on an indicator of an energy of the obtained sound signal and/or on a reception of a signaling of a sound event.

11. The method of claim 10, further comprising a step of notifying a sound event when a sound event is detected and/or when a signaling is received.

12. A system for monitoring noise at a construction site, comprising:

a sound sensor configured to acquire a sound signal; and a data processor configured to perform the steps of:

S1: obtaining a sound signal emitted at a construction site and acquired by a sound sensor;

S2: applying a frequency filter to the obtained sound signal, thereby obtaining a filtered signal;

S4: extracting features from the filtered signal;

S5: identifying a specific sound source by applying a classification model to the features extracted in step S4 and providing at least one label associated to the a specific sound source, wherein the specific sound source is a parent source as defined in a hierarchic model in which each sound source is either a parent source or a child source linked to a parent source; and a post-processing step, subsequent to step S5, which comprises the following sub-steps:

evaluating a sound level of the obtained sound signal and comparing the evaluated sound level with a first predetermined threshold, said evaluating is then considered reliable if the evaluated sound level is greater than the first predetermined threshold;

comparing a value representing a level of confidence associated with the presence of the specific sound source in the obtained sound signal with a second predetermined threshold;

based on the value representing the level of confidence associated with the specific sound source being greater than the second predetermined threshold:

selecting, from one or more child sources linked to the specific sound source, the child source having a highest level of confidence associated with the presence of the child source in the obtained sound signal;

comparing the level of confidence associated with the presence of the selected child source in the obtained sound signal with a third predetermined threshold;

based on the level of confidence associated with the presence of the selected child source in the obtained sound signal being greater than the third predetermined threshold, the specific sound source is changed to the selected child source; and based on the level of confidence associated with the presence of the selected child source in the obtained sound signal being lower than the third predetermined threshold, the specific sound source remains the parent source; and based on the value representing the level of confidence associated with the specific sound source being lower than the second predetermined threshold, said identifying is considered not reliable;

communicating an identification signal to a client device based on the identifying is being reliable, and not communicating an identification signal based on the identifying being not reliable.

13. The system of claim 12, further comprising a detector configured to detect a sound event based on an indicator of an energy of the obtained sound signal and/or on the reception of a signaling of a sound event.

14. The system of claim 13, further comprising a mobile terminal configured to signal the sound event.

* * * * *